United States Patent
Yang

(10) Patent No.: US 7,995,691 B2
(45) Date of Patent: Aug. 9, 2011

(54) REAL-TIME CHANNEL ESTIMATION SYSTEM

(75) Inventor: Fang-Ming Yang, Tainan (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 662 days.

(21) Appl. No.: 12/081,624

(22) Filed: Apr. 18, 2008

(65) Prior Publication Data

US 2008/0260081 A1   Oct. 23, 2008

(30) Foreign Application Priority Data

Apr. 20, 2007 (TW) ................................ 96113977 A

(51) Int. Cl.
*H04B 1/10* (2006.01)
(52) U.S. Cl. ......... 375/350; 375/316; 375/340; 375/349
(58) Field of Classification Search .................. 375/316, 375/340, 350
See application file for complete search history.

(56) References Cited

U.S. PATENT DOCUMENTS

2007/0036232 A1* 2/2007 Hayashi ........................ 375/260
* cited by examiner

*Primary Examiner* — Leon Flores
(74) *Attorney, Agent, or Firm* — Bacon & Thomas, PLLC

(57) ABSTRACT

A real-time channel estimation system, which receives a wireless transmission signal through a wireless channel and estimates channel parameters of the wireless channel in real-time. The system includes a channel estimator to receive the wireless transmission signal and output the channel parameters; first and second filters to filter the channel parameters for producing a first and a second sets of filtered channel parameters; first and second calculators to compute according to the first and the second sets of filtered channel parameters and the wireless transmission signal for producing a first and a second probabilities; a comparator to compare the first and the second probabilities for producing an indicative signal; and a multiplexer to receive the indicative signal for accordingly selecting the first or second set of filtered channel parameters as an output.

12 Claims, 3 Drawing Sheets

REAL-TIME CHANNEL ESTIMATION SYSTEM

BACKGROUND OF THE INVENTION

1. Field of the Invention

The present invention relates to the technical field of wireless communications and, more particularly, to a real-time channel estimation system, which is suitable for a single- and multi-carrier system and uses a known pilot signal to complete an estimation in real-time.

2. Description of Related Art

In wireless transmissions, channels for communications can be divided into static and dynamic channels. For example, a transmitting station and a set top box (STB) are located at a fixed position respectively, and the communication channel between the transmitting station and the STB is a static channel. However, the communication channel between a base station and a digital video broadcasting-handheld (DVB-H) is a dynamic channel.

FIG. 1 is a configuration of a typical wireless receiver of a DVB-H, which includes a radio frequency (RF) receiver 110, a channel compensator 120, a channel decoder 130, a source decoder 140 and a channel estimator 150 for compensating and decoding a wireless transmission signal and accordingly obtaining the associated messages. The channel estimator 150 essentially estimates a wireless channel in order to drive the channel compensator 120 to compensate an output signal of the RF receiver 110.

Due to the different communication channels, the channel estimator of the DVB-H is completely different from that of the STB in design. The channel estimator 150 of the DVB-H is focused on the dynamic channel estimation. However, the moving speed of the DVB-H is not at a constant, so the channel estimator 150 shown in FIG. 1 cannot have the effective channel estimation for various conditions, resulting in negatively affecting the quality of received signal from the DVB-H.

Therefore, it is desirable to provide an improved channel estimation system to mitigate and/or obviate the aforementioned problems.

SUMMARY OF THE INVENTION

An object of the present invention is to provide a real-time channel estimation system, which can provide effective channel estimation for various conditions and further increase the received signal quality of the DVB-H.

Another object of the present invention is to provide a real-time channel estimation system, which can apply a known pilot signal in a multi-carrier system to thereby obtain real-time channel estimation.

According to a feature of the invention, a real-time channel estimation system is provided, which receives a wireless transmission signal through a wireless channel and estimates channel parameters of the wireless channel in real-time. The system includes a channel estimator, a first filter, a second filter, a first calculator, a second calculator, a comparator and a multiplexer. The channel estimator receives the wireless transmission signal to accordingly estimate the channel parameters of the wireless channel and outputs the channel parameters. The first filter is connected to the channel estimator in order to filter the channel parameters and produce a first set of filtered channel parameters. The second filter is connected to the channel estimator in order to filter the channel parameter and produce a second set of filtered channel parameters. The first calculator is connected to the first filter in order to compute according to the first set of filtered channel parameters and the wireless transmission signal to thereby produce a first probability. The second calculator is connected to the second filter in order to compute according to the second set of filtered channel parameters and the wireless transmission signal to thereby produce a second probability. The comparator is connected to the first and the second calculators in order to compare the first and the second probabilities to thereby produce an indicative signal. The multiplexer is connected to the first filter, the second filter and the comparator in order to receive the indicative signal and accordingly select the first or second set of filtered channel parameters as an output.

According to another feature of the invention, a real-time channel estimation system is provided, which receives a wireless transmission signal through a wireless channel and estimates channel parameters of the wireless channel in real-time. The system includes a channel estimator, a first filter, a second filter, a first calculator, a second calculator, a comparator, a static channel estimator, a dynamic channel estimator and a multiplexer. The channel estimator receives the wireless transmission signal to accordingly estimate the channel parameters of the wireless channel and outputs the channel parameters. The first filter is connected to the channel estimator in order to filter the channel parameters and produce a first set of filtered channel parameters. The second filter is connected to the channel estimator in order to filter the channel parameter and produce a second set of filtered channel parameters. The first calculator is connected to the first filter in order to compute according to the first set of filtered channel parameters and the wireless transmission signal to thereby produce a first probability. The second calculator is connected to the second filter in order to compute according to the second set of filtered channel parameters and the wireless transmission signal to thereby produce a second probability. The comparator is connected to the first and the second calculators in order to compare the first and the second probabilities to thereby produce an indicative signal. The static channel estimator receives the wireless transmission signal, accordingly estimates a plurality of static channel parameters of the wireless channel, and outputs the plurality of static channel parameters. The dynamic channel estimator receives the wireless transmission signal, accordingly estimates a plurality of dynamic channel parameters of the wireless channel, and outputs the plurality of dynamic channel parameters. The multiplexer is connected to the static channel estimator, the dynamic channel estimator and the comparator in order to receive the indicative signal and accordingly select the plurality of static or dynamic channel parameters as an output.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
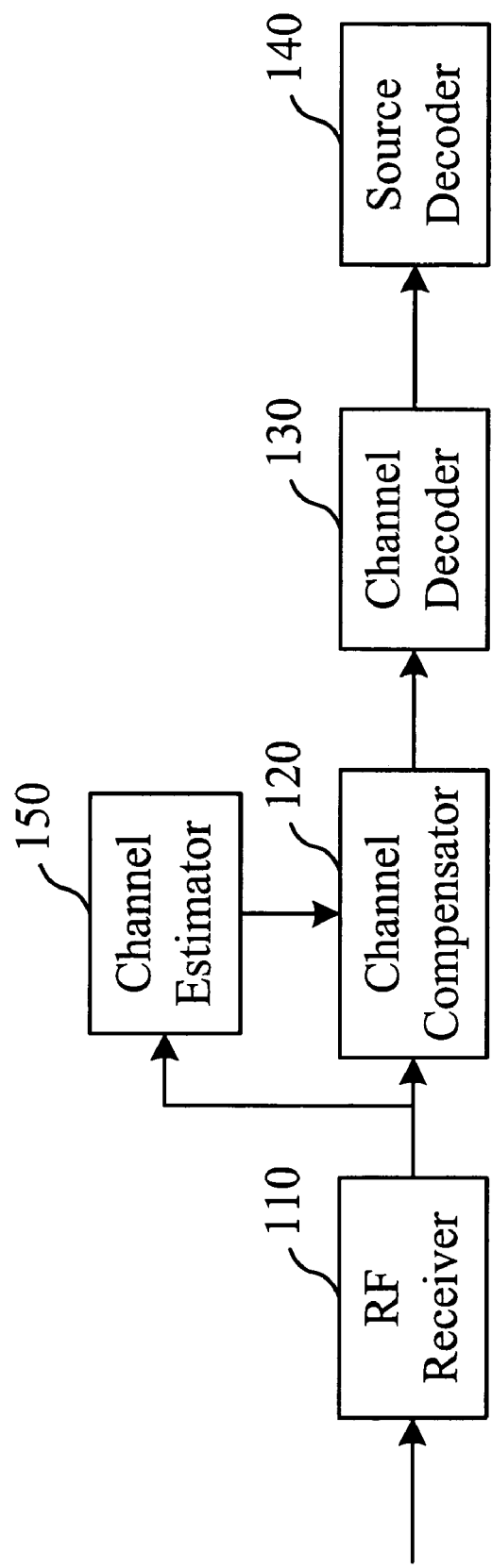
FIG. 1 is a configuration of a typical wireless receiver of a DVB-H.
Figure 2:
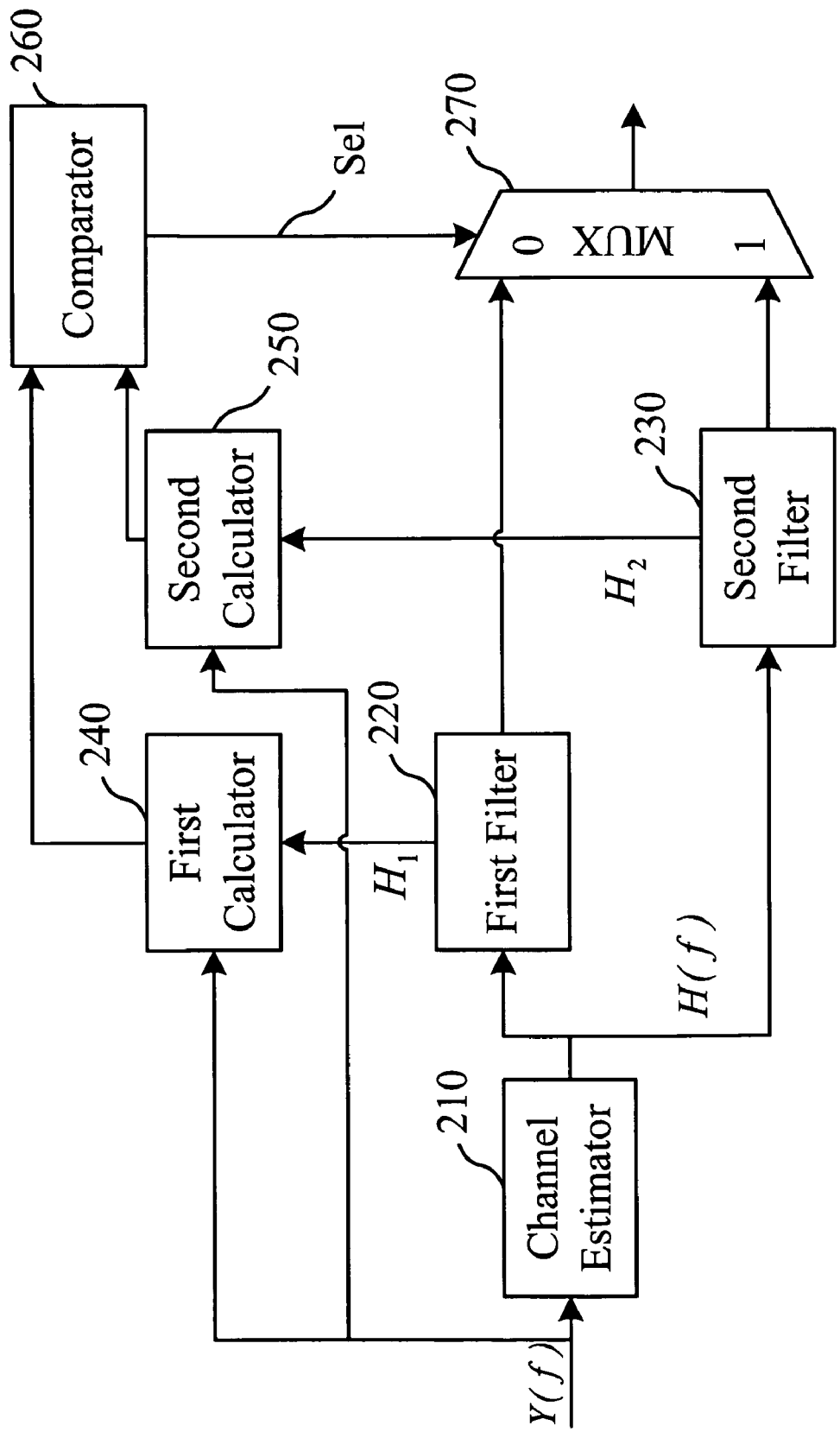
FIG. 2 is a block diagram of a real-time channel estimation system according to an embodiment of the invention.

FIG. 2 is a block diagram of a real-time channel estimation system according to an embodiment of the invention, which receives a wireless transmission signal Y(f) through a wireless channel and estimates channel parameters of the wireless channel in real-time. In FIG. 2, the system includes a channel estimator 210, a first filter 220, a second filter 230, a first calculator 240, a second calculator 250, a comparator 260 and a multiplexer 270.

The channel estimator 210 receives the wireless transmission signal Y(f) to accordingly estimate the channel parameters H(f) of the wireless channel and outputs the channel parameters H(f), wherein the wireless transmission signal Y(f) and the channel parameters H(f) of the wireless channel are expressed in frequency domain.

The wireless transmission signal Y(f) contains a pilot signal S(f) and a noise N(f), which have a relation of $$Y(f)=S(f)H(f)+N(f),$$

wherein the pilot signal S(f) and the noise N(f) are expressed in frequency domain.

The first filter 220 is connected to the channel estimator 210 in order to filter the channel parameters H(f) and produce a first set $H_1$ of filtered channel parameters. The first filter 220 is associated with a static channel. The first set $H_1$ of filtered channel parameters is expressed as:

$$H_1(f)=H(f)\cdot T_1(f),$$

where H(f) indicates the channel parameters of the wireless channel in frequency domain, and $T_1(f)$ indicates a transfer function of the first filter 220 that is expressed in frequency domain.

The second filter 230 is connected to the channel estimator 210 in order to filter the channel parameter H(f) and produce a second set $H_2$ of filtered channel parameters. The second filter 230 is associated with a dynamic channel. The bandwidth of the first filter 220 is smaller than that of the second filter 230.

The second set $H_2$ of filtered channel parameters is expressed as:

$$H_2(f)=H(f)\cdot T_2(f),$$

where H(f) indicates the channel parameters of the wireless channel in frequency domain, and $T_2(f)$ indicates a transfer function of the second filter 230 that is expressed in frequency domain.

The first calculator 240 is connected to the first filter 220 in order to compute according to the first set $H_1$ of filtered channel parameters and the wireless transmission signal Y(f) to thereby produce a first probability A.

The first probability A is expressed as:

$$A = P(y \mid H_1) = \frac{1}{\sqrt{2\pi}\,\sigma_n} \exp\left[-\frac{(y-sH_1)^2}{2\sigma_n^2}\right],$$

where y indicates the wireless transmission signal, $H_1$ indicates the first set of filtered channel parameters, s indicates the pilot signal, and $\sigma_n$ indicates a variance of the noise.

The second calculator 250 is connected to the second filter 230 in order to compute according to the second set $H_2$ of filtered channel parameters and the wireless transmission signal Y(f) to thereby produce a second probability B. The second probability is expressed as:

$$B = P(y \mid H_2) = \frac{1}{\sqrt{2\pi}\,\sigma_n} \exp\left[-\frac{(y-sH_2)^2}{2\sigma_n^2}\right],$$

where y indicates the wireless transmission signal, $H_2$ indicates the second set of filtered channel parameters, s indicates the pilot signal, and $\sigma_n$ indicates a variance of the noise. A current channel can be determined as a dynamic or static channel according to a Maximum Likelihood (ML) principle in reference to the first probability A and the second probability B.

The comparator 260 is connected to the first and the second calculators 240 and 250 in order to compare the first and the second probabilities A and B to thereby produce an indicative signal Sel. When the first probability A is greater than the second probability B, the indicative signal Sel is a low voltage to indicate that the current wireless channel as a static channel has the probability higher than as a dynamic channel. When the first probability A is smaller than the second probability B, the indicative signal Sel is a low voltage to indicate that the current wireless channel as a dynamic channel has the probability higher than as a static channel.

The multiplexer 270 is connected to the first filter 220, the second filter 230 and the comparator 260 in order to receive the indicative signal Sel and accordingly select the first set $H_1$ of filtered channel parameters or the second set $H_2$ of filtered channel parameters as an output. When the first probability A is greater than the second probability B, it indicates that the current wireless channel as a static channel has the probability higher than as a dynamic channel, so the indicative signal Sel selects the first set $H_1$ of filtered channel parameters as the output. Conversely, when the first probability A is smaller than the second probability B, it indicates that the current wireless channel as a static channel has the probability smaller than as a dynamic channel, so the indicative signal Sel selects the second set $H_2$ of filtered channel parameters as the output.

In this embodiment, the channel estimator 210 combines the first filter 220 into a static channel estimator, so that an output of the first filter 220 results from static channel estimation. The channel estimator 210 combines the second filter 230 into a dynamic channel estimator, so that an output of the second filter 230 results from dynamic channel estimation. The multiplexer 270 is based on the signal Sel to select the output (i.e., the result produced by the static channel estimation) from the first filter 220 or the output (i.e., the result produced by the dynamic channel estimation) from the second filter 230 as the real-time channel estimation.

Figure 3:
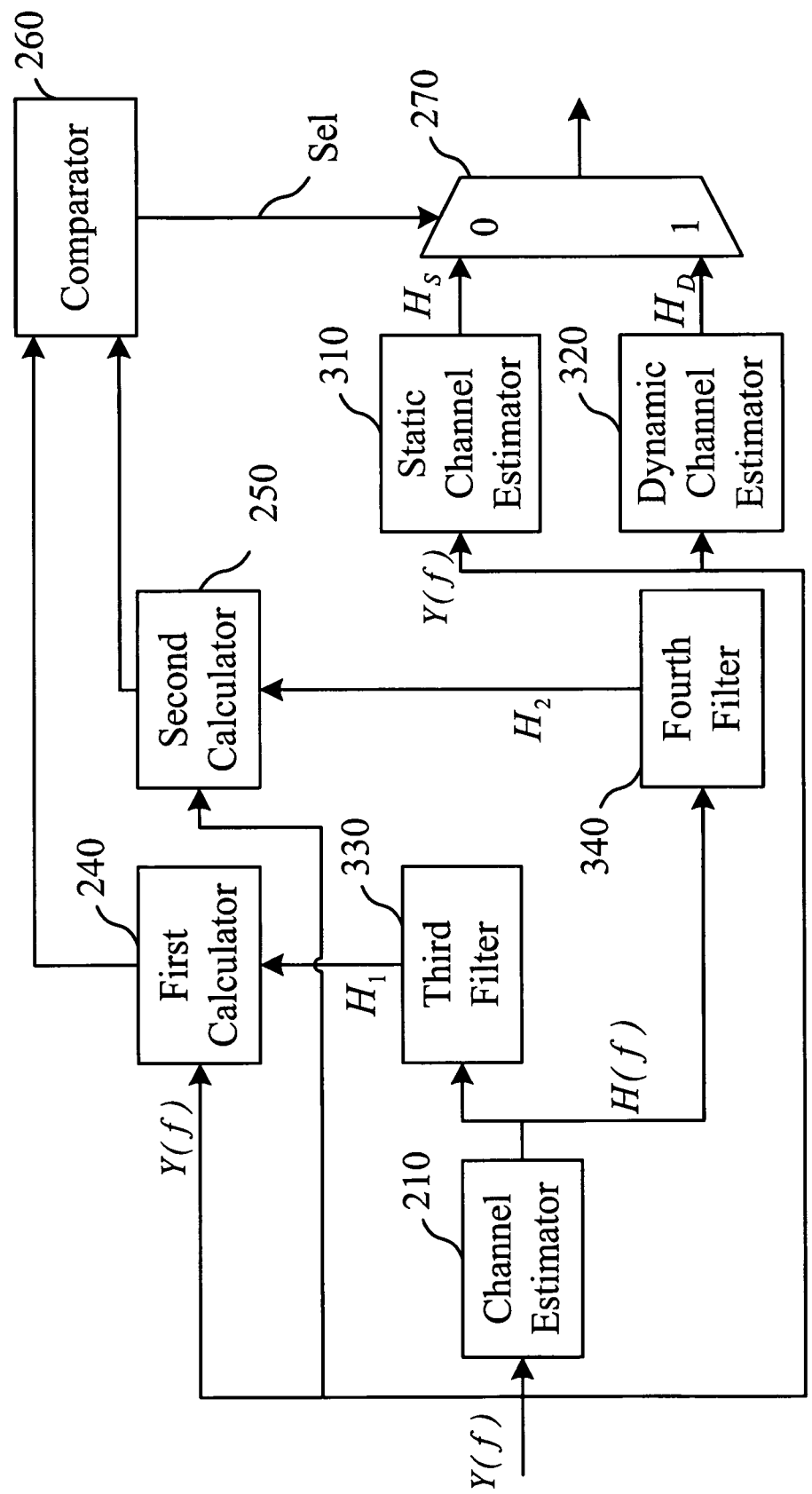
FIG. 3 is a block diagram of a real-time channel estimation system according to another embodiment of the invention.

FIG. 3 is a block diagram of a real-time channel estimation system according to another embodiment of the invention. In this embodiment, as compared to that of FIG. 2, the system adds a static channel estimator 310 and a dynamic channel estimator 320, and replaces the first filter 220 with a third filter 330 and the second filter 230 with a fourth filter 340.

The circuit design associated with the third filter 330 and the fourth filter 340 is simpler than that associated with the first filter 220 and the second filter 230. Namely, the third and the fourth filters 330 and 340 have fewer orders than the first filter 220 and the second filter 230. The channel estimator 210 combines the third filter 330 for providing the information whether a wireless channel is a static channel or not. The channel estimator 210 combines the fourth filter 340 for providing the information whether a wireless channel is a dynamic channel or not. The output of the third filter 330 is computed by the first calculator 240 to thereby produce the first probability A, and the output of the third filter 340 is computed by the second calculator 250 to thereby produce the second probability B. Further, the Maximum Likelihood (ML) principle in reference to the first probability A and the second probability B is used to determine a current channel as a dynamic or static channel. When the current channel is determined as a static channel, the multiplexer 270 selects the output of the static channel estimator 310 as an output. When the current channel is determined as a dynamic channel, the multiplexer 270 selects the output of the dynamic channel estimator 320 as an output.

The static channel estimator 310 receives the wireless transmission signal Y(f), accordingly estimates a plurality of static channel parameters $H_S$ of the wireless channel, and outputs the static channel parameters $H_S$.

The dynamic channel estimator 320 receives the wireless transmission signal Y(f), accordingly estimates a plurality of dynamic channel parameters $H_D$ of the wireless channel, and outputs the dynamic channel parameters $H_D$.

The multiplexer 270 is connected to the static channel estimator 310, the dynamic channel estimator 320 and the comparator 260 in order to receive the indicative signal Sel and accordingly select the static or dynamic channel parameters $H_S$ or $H_D$ as an output.

As cited, the invention provides a real-time channel estimation system with a new configuration. The system can concurrently perform a static and a dynamic channel estimations. In addition, the invention uses the first calculator 240, the second calculator 250 and the comparator 260 to determine which estimation, the static or dynamic channel estimation, is used in the real-time channel estimation system as a current estimation. Therefore, the invention can provide an effective channel estimation at various conditions and enhance the received signal quality of a digital video broadcasting-handheld (DVB-H).

Although the present invention has been explained in relation to its preferred embodiment, it is to be understood that many other possible modifications and variations can be made without departing from the spirit and scope of the invention as hereinafter claimed.

What is claimed is:

1. A real-time channel estimation system, which receives a wireless transmission signal through a wireless channel and estimates channel parameters of the wireless channel in real-time, the system comprising:
a channel estimator, which receives the wireless transmission signal to accordingly estimate and output the channel parameters of the wireless channel;
a first filter, which is connected to the channel estimator in order to filter the channel parameters and produce a first set of filtered channel parameters;
a second filter, which is connected to the channel estimator in order to filter the channel parameter and produce a second set of filtered channel parameters, wherein the first filter is associated with a static channel and the second filter is associated with a dynamic channel and the first filter has a bandwidth smaller than the second filter;
a first calculator, which is connected to the first filter in order to compute according to the first set of filtered channel parameters and the wireless transmission signal to thereby produce a first probability;
a second calculator, which is connected to the second filter in order to compute according to the second set of filtered channel parameters and the wireless transmission signal to thereby produce a second probability;
a comparator, for comparing the first probability and the second probability to thereby produce an indicative signal; and
a multiplexer, which is connected to the first filter, the second filter and the comparator, in order to receive the indicative signal and accordingly select the first or second set of filtered channel parameters as an output;
wherein the wireless transmission signal comprises a pilot signal and a noise and the wireless transmission signal, the pilot signal and the noise form a relation of:

$Y(f)=S(f)H(f)+N(f)$, where Y(f) indicates the wireless transmission signal in frequency domain, S(f) indicates the pilot signal in frequency domain, N(f) indicates the noise in frequency domain, and H(f) indicates the channel parameters of the wireless channel in frequency domain;
wherein the first probability is expressed as:

$$P(y|H_1) = \frac{1}{\sqrt{2\pi}\,\sigma_n}\exp\left[-\frac{(y-sH_1)^2}{2\sigma_n^2}\right],$$

where y indicates the wireless transmission signal, $H_1$ indicates the first set of filtered channel parameters, s indicates the pilot signal, and $\sigma_n$ indicates a variance of the noise.

2. The system as claimed in claim 1, wherein the second probability is expressed as:

$$P(y|H_2) = \frac{1}{\sqrt{2\pi}\,\sigma_n}\exp\left[-\frac{(y-sH_2)^2}{2\sigma_n^2}\right],$$

where y indicates the wireless transmission signal, $H_2$ indicates the second set of filtered channel parameters, s indicates the pilot signal, and $\sigma_n$ indicates a variance of the noise.

3. The system as claimed in claim 2, wherein the first set $H_1(f)$ of filtered channel parameters is expressed as:

$H_1(f)=H(f)\cdot T_1(f)$, where H(f) indicates the channel parameters of the wireless channel in frequency domain, and $T_1(f)$ indicates a transfer function of the first filter that is expressed in frequency domain.

4. The system as claimed in claim 2, wherein the second set $H_2(f)$ of filtered channel parameters is expressed as:

$H_2(f)=H(f)\cdot T_2(f)$, where H(f) indicates the channel parameters of the wireless channel in frequency domain, and $T_2(f)$ indicates a transfer function of the second filter that is expressed in frequency domain.

5. The system as claimed in claim 4, wherein the indicative signal is a high voltage to select the second set of filtered channel parameters as an output of the multiplexer when the first probability is smaller than the second probability.

6. The system as claimed in claim 4, wherein the indicative signal is a low voltage to select the first set of filtered channel parameters as an output of the multiplexer when the first probability is not smaller than the second probability.

7. A real-time channel estimation system, which receives a wireless transmission signal through a wireless channel and estimates channel parameters of the wireless channel in real-time, the system comprising:

a channel estimator, which receives the wireless transmission signal to accordingly estimate and output the channel parameters of the wireless channel;

a first filter, which is connected to the channel estimator, in order to filter the channel parameters and produce a first set of filtered channel parameters;

a second filter, which is connected to the channel estimator in order to filter the channel parameter and produce a second set of filtered channel parameters, wherein the first filter is associated with a static channel and the second filter is associated with a dynamic channel, and the first filter has a bandwidth smaller than the second filter;

a first calculator, which is connected to the first filter in order to compute according to the first set of filtered channel parameters and the wireless transmission signal to thereby produce a first probability;

a second calculator, which is connected to the second filter in order to compute according to the second set of filtered channel parameters and the wireless transmission signal to thereby produce a second probability;

a comparator, which is connected to the first calculator and the second calculator in order to compare the first probability and the second probability to thereby produce an indicative signal;

a static channel estimator, which receives the wireless transmission signal, accordingly estimates a plurality of static channel parameters from the wireless channel;

a dynamic channel estimator, which receives the wireless transmission signal, accordingly estimates a plurality of dynamic channel parameters from the wireless channel; and a multiplexer, which is connected to the static channel estimator, the dynamic channel estimator and the comparator, in order to receive the indicative signal and accordingly select the plurality of static channel parameters or the plurality of dynamic channel parameters as an output;

wherein the wireless transmission signal comprises a pilot signal and a noise, and the wireless transmission signal, the pilot signal and the noise form a relation of:

$Y(f)=S(f)H(f)+N(f)$, where Y(f) indicates the wireless transmission signal in frequency domain, S(f) indicates the pilot signal in frequency domain, N(f) indicates the noise in frequency domain, and H(f) indicates the channel parameters of the wireless channel in frequency domain;

wherein the first probability is expressed as:

$$P(y\mid H_1) = \frac{1}{\sqrt{2\pi}\,\sigma_n}\exp\left[-\frac{(y-sH_1)^2}{2\sigma_n^2}\right],$$

where y indicates the wireless transmission signal, $H_1$ indicates the first set of filtered channel parameters, s indicates the pilot signal, and $\sigma_n$, indicates a variance of the noise.

8. The system as claimed in claim 7, wherein the second probability is expressed as:

$$P(y\mid H_2) = \frac{1}{\sqrt{2\pi}\,\sigma_n}\exp\left[-\frac{(y-sH_2)^2}{2\sigma_n^2}\right],$$

where y indicates the wireless transmission signal, $H_2$ indicates the second set of filtered channel parameters, s indicates the pilot signal, and $\sigma_n$, indicates a variance of the noise.

9. The system as claimed in claim 7, wherein the first set $H_1(f)$ of filtered channel parameters is expressed as:

$H(f)=H(f)\cdot T_1(f)$, where H(f) indicates the channel parameters of the wireless channel in frequency domain, and $T_1(f)$ indicates a transfer function of the first filter that is expressed in frequency domain.

10. The system as claimed in claim 8, wherein the second set $H_2(f)$ of filtered channel parameters is expressed as:

$H_2(f)=H(f)\cdot T_2(f)$, where H(f) indicates the channel parameters of the wireless channel in frequency domain, and $T_2(f)$ indicates a transfer function of the second filter that is expressed in frequency domain.

11. The system as claimed in claim 10, wherein the indicative signal is a high voltage to select the dynamic channel parameters as an output of the multiplexer when the first probability is smaller than the second probability.

12. The system as claimed in claim 11, wherein the indicative signal is a low voltage to select the static channel parameters as an output of the multiplexer when the first probability is not smaller than the second probability.

* * * * *